No. 734,818. Patented July 28, 1903.

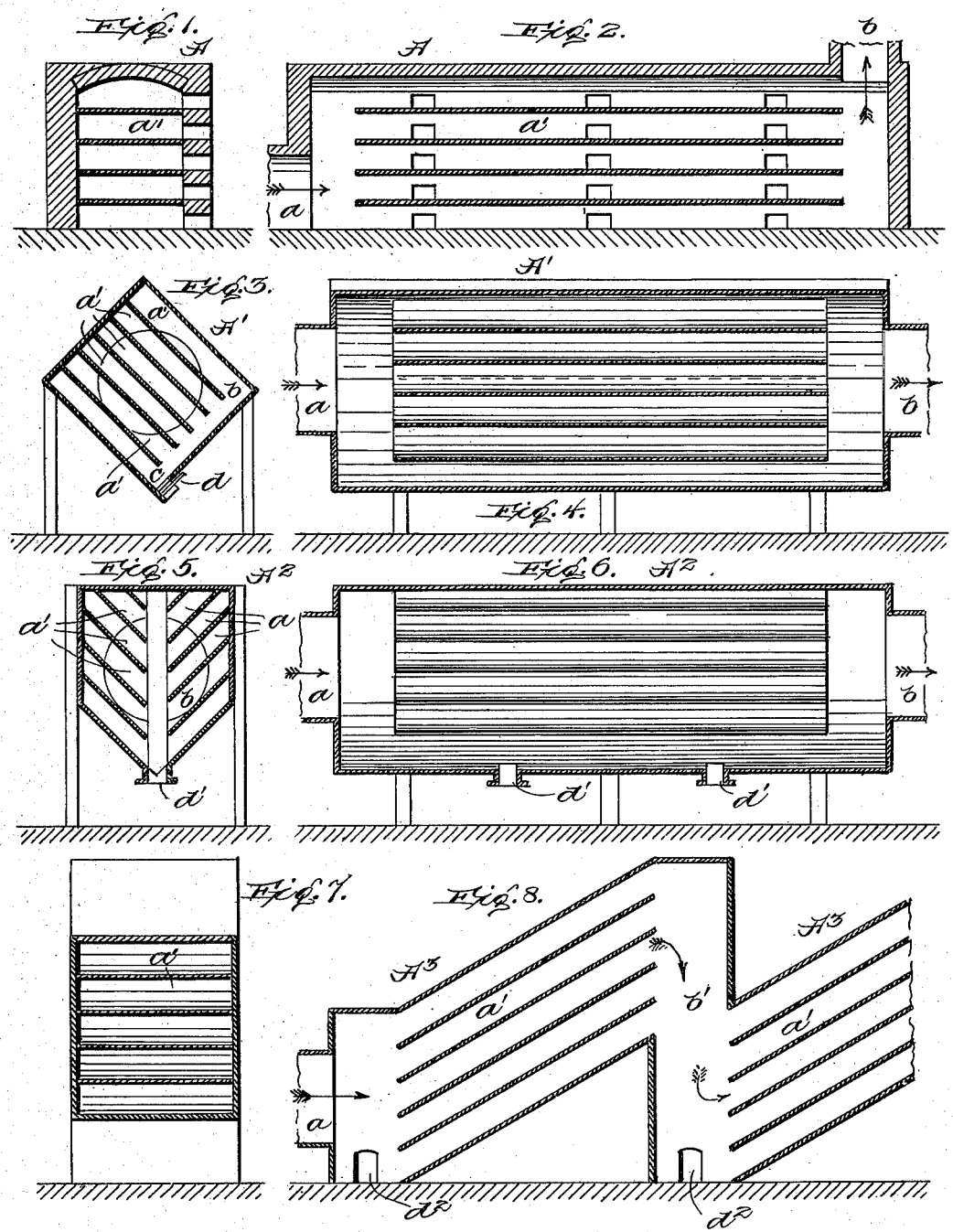

UNITED STATES PATENT OFFICE.

FRANZ CAZIN, OF DENVER, COLORADO, AND LLEWELLYN J. W. JONES, OF TACOMA, WASHINGTON.

DUST-CHAMBER FOR FURNACES.

SPECIFICATION forming part of Letters Patent No. 734,818, dated July 28, 1903.

Application filed April 22, 1903. Serial No. 153,880. (No model.)

*To all whom it may concern:*

Be it known that we, FRANZ CAZIN, a citizen of the United States, residing at Denver, in the county of Denver and State of Colorado, and LLEWELLYN J. W. JONES, formerly a citizen of Great Britain, (but having duly declared my intention of becoming a citizen of the United States,) now residing at Tacoma, in the State of Washington, have invented certain new and useful Improvements in Dust-Chambers, of which the following is a specification.

Our invention relates to that class of dust-chambers used in connection with metallurgical and other furnaces or in connection with the ventilating-fans which suck air and dust from dry-crushing machines and deliver the same to spacious dust-chambers where the dust is deposited. In both cases the object is to make the dust-chambers of such size or shape that the gases or air escaping therefrom carry away little or no dust. If the collected dust is valuable, it may be saved; but in any event it will be prevented from entering the atmosphere. Dust-chambers for lead and copper furnaces are commonly constructed of great length, some one thousand feet long, in order that in traversing such a distance all of the dust particles will fall by gravity at some point within the chamber and there remain; but notwithstanding the great length of chambers employed much of the finer dust goes out with the draft or current.

The object of our invention is to provide a dust-chamber of less length than those commonly employed, while having the same cross-area and efficiency by reason of its subdivision into a series of low wide passages by partitions extending in the line of the draft or current. This object we accomplish by the construction shown in the accompanying drawings, in which—

Figure 1 is a transverse vertical section of one form of our improved dust-chamber. Fig. 2 is a central vertical longitudinal section thereof. Figs. 3 and 4, 5 and 6, and 7 and 8 are similar sections of three other forms thereof. Figs. 9, 9$^a$ are detail views of a portion of one of the partitions having grooves or riffles.

In Figs. 1 and 2, A designates the dust-chamber, provided at one end with an inlet $a$ for the dust-laden gas or air and having an outlet $b$ at its opposite end. This chamber A, while having the necessary cross-area, is divided into a number of open-ended passages by means of suitable partitions which extend in the direction of the length of the chamber, but do not extend fully to either of its ends, and therefore while the length of the chamber has been materially shortened its area remains the same and the collection of dust is greatly facilitated.

In Figs. 1 and 2 there are four horizontal partitions $a'$, and so there are five passages formed, which renders the length of the chamber only one-fifth the length of the present long non-subdivided chambers commonly used. The dust will be removed from the partitions through suitable doors. The same result can be obtained by placing the partitions at an incline, as shown in Figs. 3 and 4, where the dust-chamber A' is rectangular in cross-section, but is set with its sides at an angle, and the partitions $a'$ extend at an incline from one upper side toward the opposite lower inclined side, so that the particles of dust will slide down into the space $c$, from which it may be withdrawn by means of gates or valves $d$ or by any suitable form of conveyer, as may be desired.

In Figs. 5 and 6 the partitions $a'$ incline from the vertical side walls of the chamber A$^2$ inwardly and downwardly toward the middle of the chamber, and so the particles of dust will slide down the partitions to the V-shape bottom of the chamber, from which it may be withdrawn through suitable outlets $d'$.

In Figs. 7 and 8 the dust-chambers A$^3$ are shown in connected series, one chamber inclining upwardly from front to rear to an outlet $b'$, which opens downwardly into the upper side of the lower forward end of the next chamber in advance, and so on as far as may be desired.

In Figs. 7 and 8 the partitions $a'$ extend parallel with the top and bottom of the chambers and from side to side thereof. The dust will slide down these partitions into spaces at the front ends of the chambers, from which it may be removed through the outlets $d^2 d^2$.

In all of these several forms of dust-cham bers the partitions extend in the direction of the draft or current, so as not to impede it, and are therefore not to be likened in their action to what are known as "baffles" or "baffle-plates," which are set across the path of the current or draft to deflect it back and forth.

In our construction the volume of gases or air is merely divided into a number of currents of less height than the height of the chamber in order to more readily deposit the dust by gravity upon the several partitions.

In all of the forms of our apparatus there is a space at the inlet end of the dust-chamber for the incoming dust-laden gases or air to pass to the several spaces formed by the partitions or shelves, while a similar space is left at the rear ends of the shelves for the passage of the dust-freed gases or air to the outlet $b$.

With our improved dust-chamber the finest particles of dust issuing from lead and copper furnaces will be caused to deposit, and this is due to what is, in effect, widening the chamber and correspondingly lessening its height. For instance, where dust would escape from a chamber a thousand feet long it will all be caught by widening such chamber, say, tenfold and giving it one-tenth of its height; but as this would in most cases cost too much and take up too much room we put in the partitions, and so make a series of low wide chambers or passages which accomplish the same results as the single wide chamber referred to.

The partitions $a'$ are either plain or provided with grooves $a^2$ or riffles, if desired, to prevent the settled dust from being blown along with the current.

What we claim is—

1. A dust-chamber having an inlet and an outlet at its ends for the gas or air, and a series of longitudinal partitions extending in the direction of the draft or current and subdividing the chamber between its inlet and outlet into a plurality of open-ended passages of less height than width, the said partitions being substantially inclined to a vertical plane passing longitudinally through the chamber.

2. A dust-chamber having an inlet and an outlet at its ends for the gas or air, and a series of longitudinal partitions extending in the direction of the draft or current and subdividing the chamber between its inlet and outlet into a plurality of open-ended passages of less height than width; said partitions being inclined to discharge the dust on the bottom of the chamber, said partitions being also substantially inclined to a vertical plane passing longitudinally through the chamber.

3. A dust-chamber of rectangular cross-section having an inlet and an outlet at its ends and set with its sides at an incline to form a V-shape bottom, and a series of inclined partitions extending in the direction of the current or draft and inclined downwardly from one upper side of the chamber toward the opposite inclined lower side and subdividing the chamber into a series of passages of less height than width.

In testimony whereof we affix our signatures in presence of witnesses.

FRANZ CAZIN.
LLEWELLYN J. W. JONES.

Witnesses for Cazin:
FRANK R. BYRNS,
FRANK E. SHEPARD.
Witnesses for Jones:
B. H. BENNETTS,
F. W. CLARK.